US008562305B2

(12) United States Patent
Bau

(10) Patent No.: US 8,562,305 B2
(45) Date of Patent: Oct. 22, 2013

(54) CONTROLLED MAGNETOHYDRODYNAMIC FLUIDIC NETWORKS AND STIRRERS

(75) Inventor: Haim H. Bau, Swarthmore, PA (US)

(73) Assignee: The Trustees Of The University Of Pennsylvania, Philadelphia, PA (US)

( * ) Notice: Subject to any disclaimer, the term of this patent is extended or adjusted under 35 U.S.C. 154(b) by 242 days.

(21) Appl. No.: 12/062,050

(22) Filed: Apr. 3, 2008

(65) Prior Publication Data

US 2008/0279698 A1 Nov. 13, 2008

Related U.S. Application Data

(62) Division of application No. 10/657,302, filed on Sep. 8, 2003, now Pat. No. 7,371,051.

(60) Provisional application No. 60/409,359, filed on Sep. 9, 2002.

(51) Int. Cl.

| | |
|---|---|
| ***F04B 37/02*** | (2006.01) |
| ***F04F 99/02*** | (2006.01) |
| ***H02K 44/00*** | (2006.01) |
| ***H02K 44/08*** | (2006.01) |
| ***G21D 7/02*** | (2006.01) |

(52) U.S. Cl.
USPC .................................. 417/50; 417/48; 310/11

(58) Field of Classification Search
USPC .......................................... 417/48, 50; 310/11
See application file for complete search history.

(56) References Cited

U.S. PATENT DOCUMENTS

| | | | | |
|---|---|---|---|---|
| 3,045,599 | A * | 7/1962 | Carlson, Jr. et al. | 417/50 |
| 3,130,330 | A * | 4/1964 | Kach | 310/11 |
| 3,214,615 | A * | 10/1965 | Way | 310/11 |
| 3,450,906 | A * | 6/1969 | Klopfer | 310/11 |
| 3,535,586 | A * | 10/1970 | Sabol | 315/111.61 |
| 3,553,502 | A * | 1/1971 | Kasahara et al. | 310/11 |
| 3,827,829 | A * | 8/1974 | Tom | 417/49 |
| 5,899,666 | A * | 5/1999 | Chung et al. | 417/49 |
| 6,146,103 | A * | 11/2000 | Lee et al. | 417/50 |
| 6,733,172 | B2 | 5/2004 | Lee et al. | |
| 6,733,244 | B1 * | 5/2004 | Fritsch et al. | 417/48 |
| 7,371,051 | B2 * | 5/2008 | Bau | 417/50 |

OTHER PUBLICATIONS

Bau et al., "A Minute Magneto Hydro Dynamic (MHD) Mixer," Sensors and Actuators B, 79(2-3):205-213 (2001) Philadelphia, PA.
Bau, "A Case for Magneto Hydro Dynamics (MHD)," Proceeding of 2001 ASME International Mechanical Engineering Congress and Exposition, New York, NY (Nov. 11-16, 2001).
Bau et al., "A magneto-hydrodynamically controlled fluidic network," Sensors and Actuators B, 88:205-216 (2003) Philadelphia, PA.
Eijkel et al., "A circular ac magnetohydrodynamic micropump for chromatographic applications," Sensors and Actuators B, 92:215-221 (2003) United Kingdom.

(Continued)

*Primary Examiner* — Peter J Bertheaud
(74) *Attorney, Agent, or Firm* — Woodcock Washburn, LLP

(57) ABSTRACT

Provided are magnetohydrodynamic stirrers comprising a conduit or cavity having at least two electrodes disposed in such an orientation that, upon the application of a potential or current across the electrode pair within a magnetic field, secondary flows such as chaotic advection is generated.

13 Claims, 7 Drawing Sheets

(56) References Cited

OTHER PUBLICATIONS

Jang and Lee, "Theoretical and Experimental Study of MHD (Magneto-hydrodynamic) Micropump," Sensors and Actuators A, 80:84-89 (2000) South Korea.
Lemoff and Lee, "An AC Magnetohydrodynamic Micropump," Sensors and Actuators B, 63:178-185 (2000) Livermore, CA.
Citations from Nerac search of Nov. 9, 2000.
Qian et al., "A stirrer for magnetohydrodynamically controlled minute fluidic networks," Physics of Fluids, 14 (10) 3584-3592 (2002).
West et al., "Application of magnetohydrodynamic actuation to continuous flow chemistry," Lab Chip, 2:224-230 (2002) Cork, Ireland.
Xiang and Bau, "Complex magnetohydrodynamically low-Reynolds-number flows," Physical Rev. E. 68:016312-1016132-11 (2003) Philadelphia, PA.
Yi et al., "A magnetohydrodynamically chaotic stirrer," J. Fluid Mech., 468:158-177 (2002) Philadelphia, PA.
Zhong et al., "A Magneto Hydrodynamic (MHD) Pump Fabricated with Low Temperatures Co-Fired Ceramic Tapes," Sensors and Actuators A: Physical, 96(1):59-66 (2002) Philadelphia, PA.

* cited by examiner

FIG. 1A
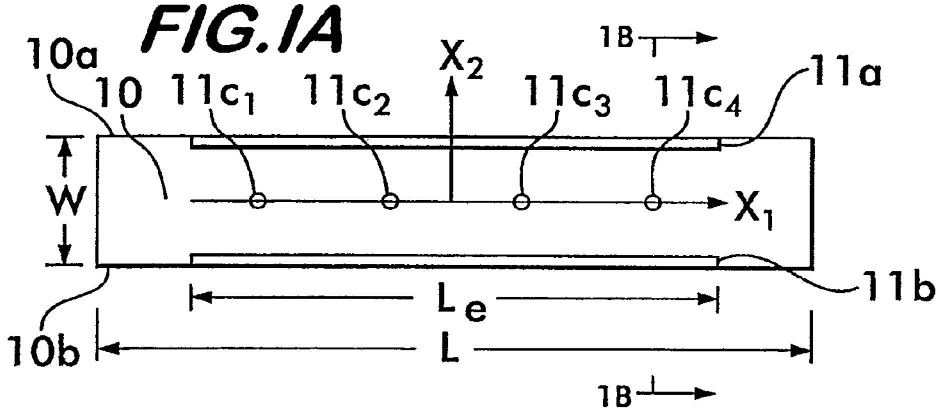
FIG. 1B
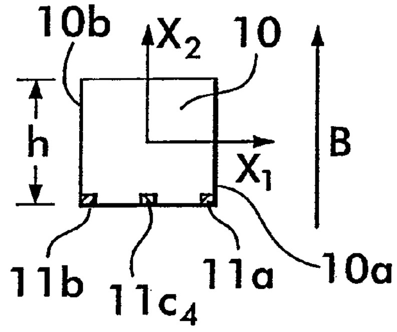
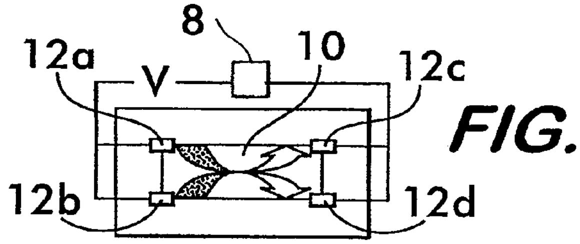
FIG. 2A
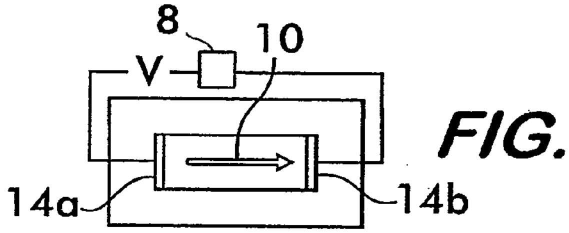
FIG. 2B
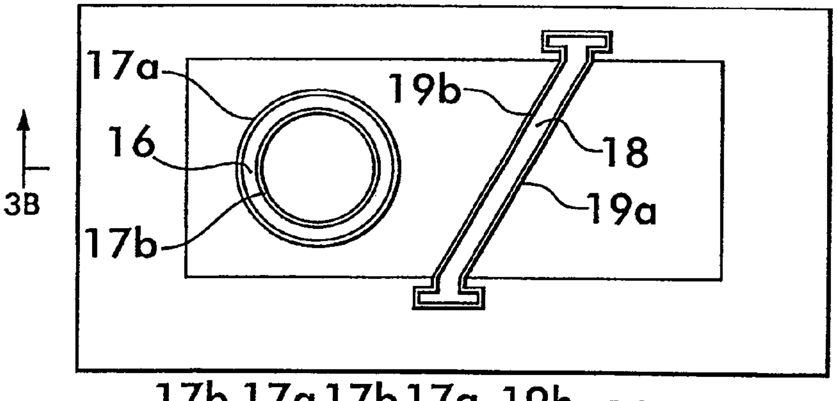
FIG. 3A
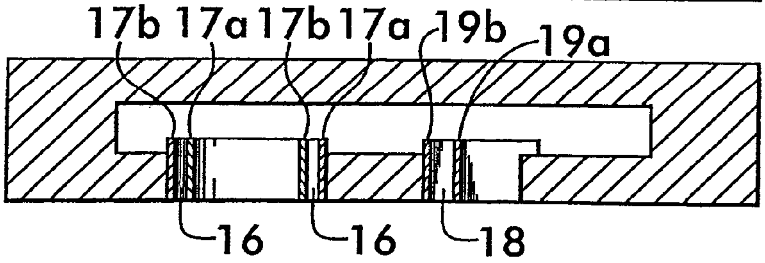
FIG. 3B FIG. 4
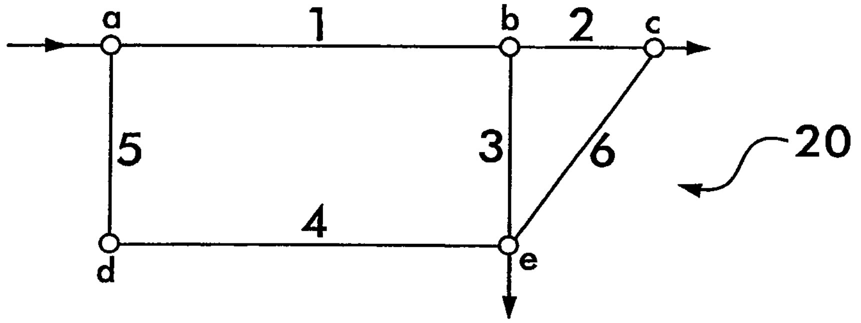
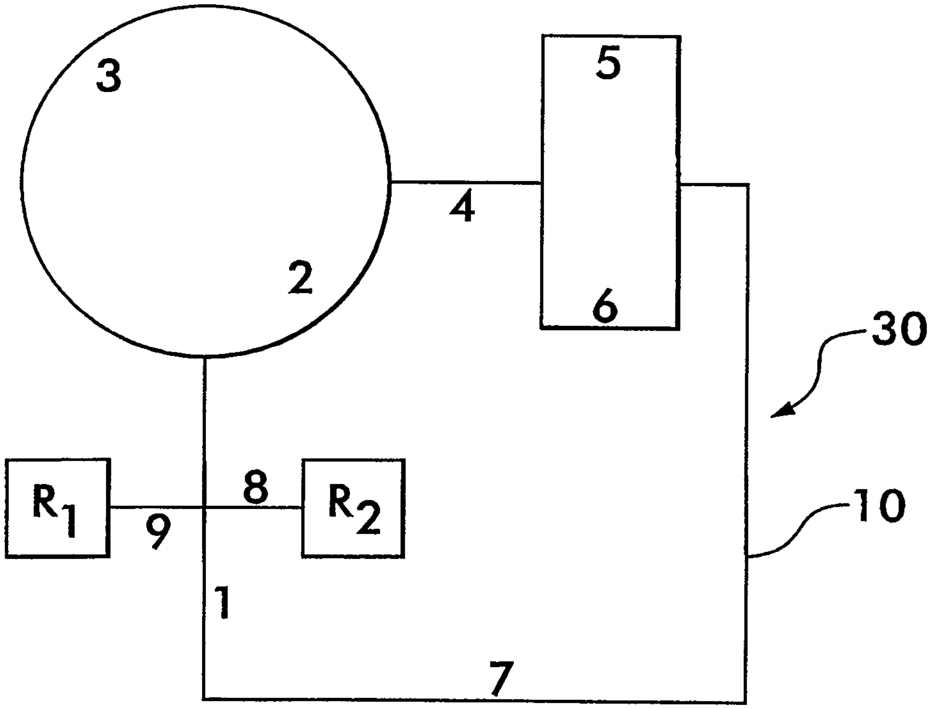
FIG. 5

FIG. 6
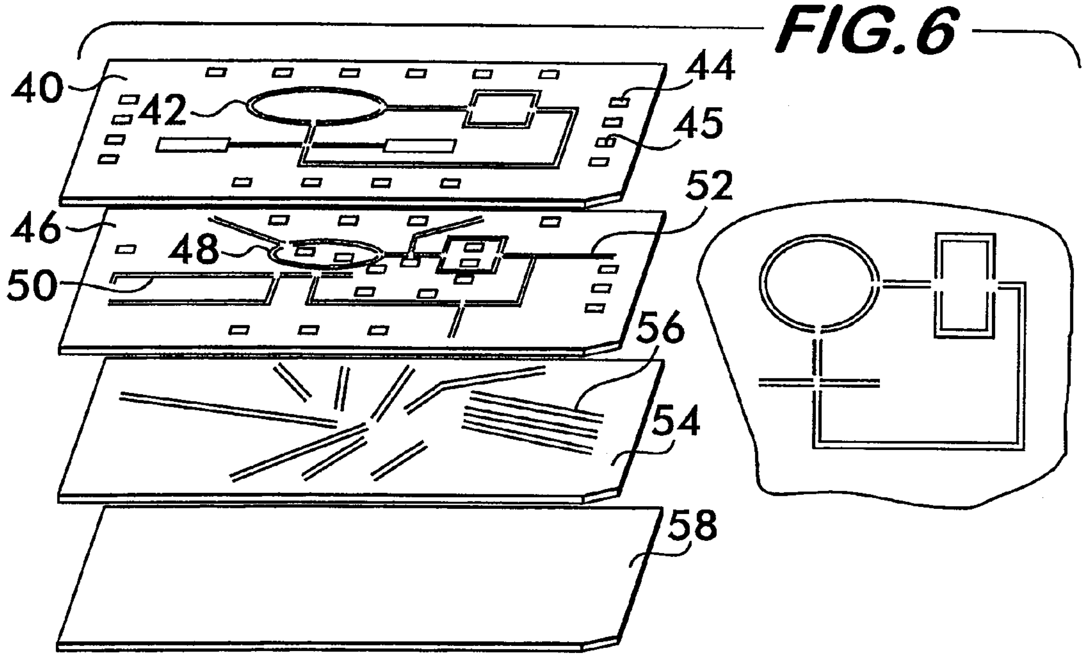
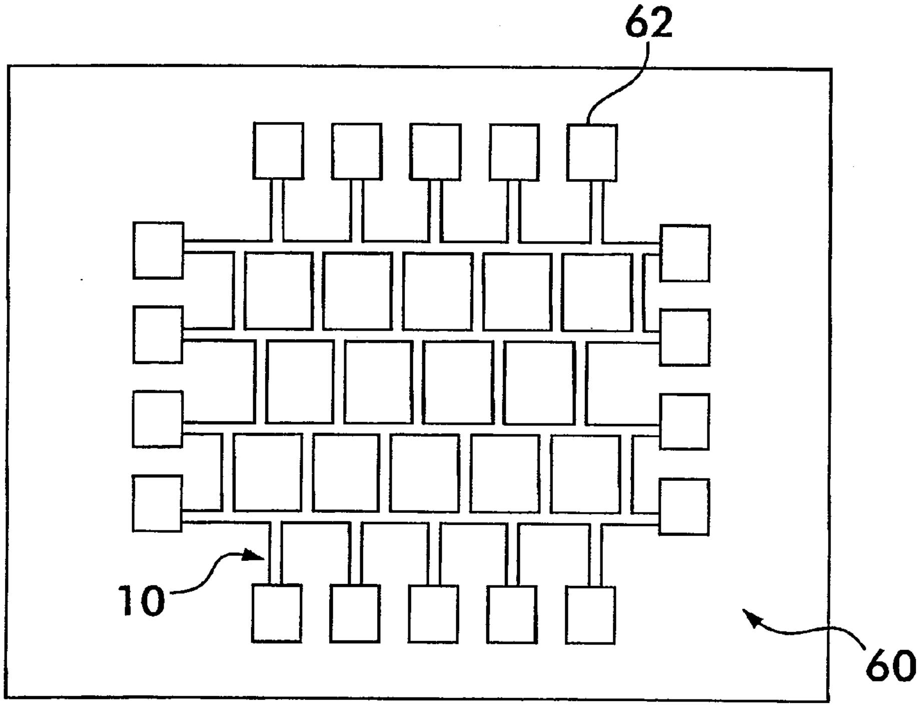
FIG. 7

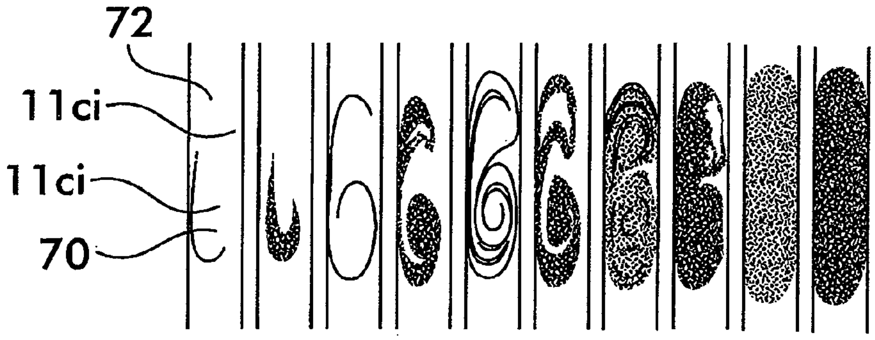
FIG.8
FIG.9
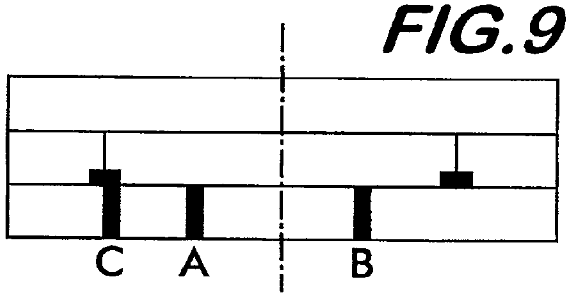
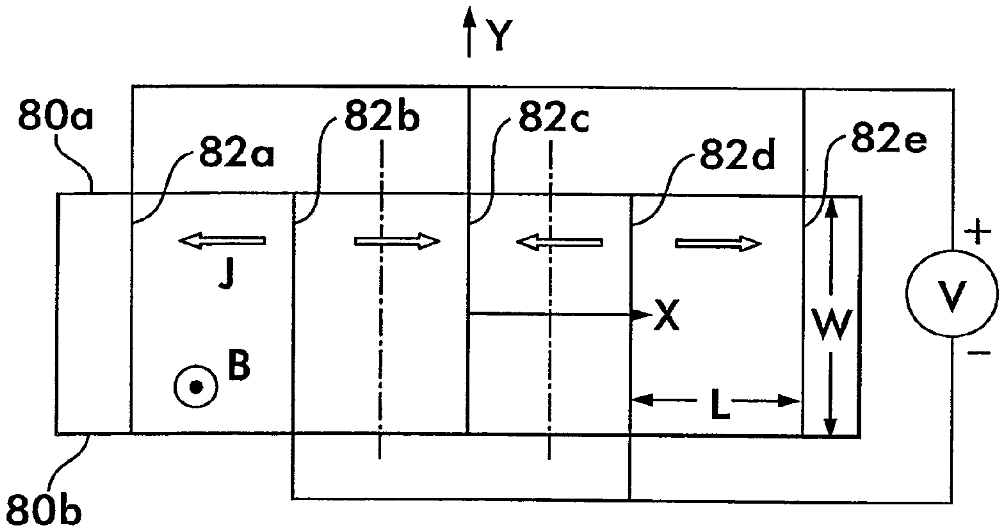
FIG.11

CONTROLLED MAGNETOHYDRODYNAMIC FLUIDIC NETWORKS AND STIRRERS

CROSS-REFERENCE TO RELATED APPLICATION

The present application is a divisional of pending U.S. application Ser. No. 10/657,302, filed Sep. 9, 2003, which in turn in based on and claims priority of U.S. provisional Application No. 60/409,359, filed Sep. 9, 2002, both of which are incorporated herein by reference.

GOVERNMENT LICENSE RIGHTS STATEMENT

This invention was supported by funds from the U.S. Government (DARPA Grant No. N66001-97-1-8911 and DARPA Grant No. N66001-01-C-8056). The U.S. Government may therefore have certain rights in the invention.

FIELD OF THE INVENTION

The invention relates to controlled, magnetohydrodynamically-driven, fluidic networks suitable for use in devices for processing and analyzing biological and chemical samples such as laboratories on chips and micro-total analysis systems. Placed within a temperature gradient, the fluidic networks of the present invention can further act as thermal cyclers, particularly of the type used for polymerase chain reactions (PCR). The invention also relates to magnetohydrodynamic stirrers that are capable of generating chaotic advection within a microfluidic conduit or chamber.

BACKGROUND OF THE INVENTION

In recent years, there has been a growing interest in developing minute chemical and biological laboratories, analytical devices, and reactors known collectively as laboratories on chips. The ability to perform chemical and biochemical reactions in such devices offers many benefits including reduced reactant and media volumes for safety and economy, and improved performance from increased thermal and mass transfer. In such devices, a spatially defined and controlled environment permits precise flow of reactants through the network. The flow of a fluid from one part of the device to another, and the efficient mixing of fluids are tasks that are far from trivial. In a micro-scale device such as a laboratory on a chip, mixing of fluids is a particular challenge as flows are at very low Reynolds numbers, turbulence is not available to promote mixing, and the insertion of moving components into these devices is difficult.

Electrostatic forces have been used to move liquids around such devices. These forces usually induce only very low flow rates, require the use of high electrical potentials, and can often cause significant heating of the solution which may be inappropriate for the materials being used or the reactions to be performed. The use of electromagnetic forces offers a means for manipulating at least slightly conductive liquids in microfluidic devices and systems.

The application of electromagnetic forces to pump and/or confine fluids is not new. It is known that magnetohydrodynamic (MHD) systems are capable of converting electromagnetic energy into mechanical work in fluid media. To date, MHD systems have mostly been used to pump highly conducting fluids such as liquid metals and ionized gases, to study ionospheric/astrophysical plasmas, and to control magnetic fusion devices. Recently, however, MHD micro-pumps in silicon and in ceramic substrates have been constructed demonstrating the ability of such pumps to move liquids through microscale conduits. These efforts, however, have addressed individual pumping devices and have not provided an effective means for either the controlled movement of liquids through a microfluidic network or the efficient mixing of liquids in such microscale environments. Although it is envisioned that this invention will be mostly used in the context of minute devices, the concepts are not limited for small devices and can be applied for large devices as well.

Relevant publications, each of which are incorporated herein in their entirety, are identified as follows:

Bau, H. H., 2001, *A Case for Magnetohydrodynamics*, Proceedings of the 2001 ASME International Mechanical Engineering Congress and Exhibition, New York, N.Y. 2001, November 11-16. CD. Vol 2.

Bau, H. H., Zhong, J., and Yi, M., 2001, *A Minute Magneto Hydro Dynamic* (*MHD*) *Mixer*, Sensors and Actuators B, 79/2-3, 205-213.

Bau, H., H., Zhu, J., Qian, S., and Xiang, Y., 2003, *A Magneto-Hydrodynamically Controlled Fluidic Network*, Sensors and Actuators B, 88, 205-216

Bau. H., H., Zhu, J., Qian, S., Xiang, Y., 2002, *A Magneto-Hydrodynamic Micro Fluidic Network*, IMECE 2002-33559, Proceedings of IMECE'02, 2002 ASME International Mechanical Engineering Congress & Exposition, New Orleans, La., Nov. 17-22, 2002.

Jang, V., and Lee, S. S., 2000, *Theoretical and Experimental Study of MHD* (*Magneto-hydrodynamic*) *Micropump*, Sensors and Actuators A, 80, 84-89.

Lemoff, A. V., and Lee, A. P., 2000, *An AC Magnetohydrodynamic Micropump*, Sensors and Actuators B, 63, 178-185.

Lee, A. P. and Lemoff, A., V., *Micromachined Magnetohydrodynamic Actuators and Sensors*, U.S. Pat. No. 6,146,103.

Qian, S., Zhu, J., and Bau, H. H., 2002, *A Stirrer for Magneto-Hydrodynamically Controlled Micro Fluidic Networks*, Physics of Fluids, 14 (10): 3584-3592.

Yi, M., Qian, S., and Bau, H. H., *A Magneto-hydrodynamic* (*MHD*) *Chaotic Stirrer*, J. Fluid Mechanics, 468, 153-177.

Xiang, Y. and Bau, H. H., 2003, *Complex Magneto Hydrodynamic, Low Reynolds Number Flows*, Physical Review Letters E, 68, 016312-1-016312-11.

Zhong, J., Yi, M., and Bau, H. H., 2002, *A Magneto Hydrodynamic Pump Fabricated with Low Temperature Co-fired Ceramic Tapes*, Sensors and Actuators A: Physical, 96, 1, 59-66.

SUMMARY OF THE INVENTION

One aspect of the present invention is a controlled, magnetohydrodynamically-driven, fluidic network comprising a plurality of connected and individually controlled conduits each having at least one pair of opposing walls and at least one pair of electrodes disposed along the opposing walls, and at least one electrode controller in operational engagement with the electrodes for implementing an activation sequence comprising a current or potential across electrode pairs. In a preferred embodiment, the network further comprises an algorithm for determining the activation sequence. In operation, the fluidic network is provided with an at least slightly conductive fluid, is placed at least partially within a suitable magnetic field, and an electric field of a specific current or potential is applied for a predetermined period of time across electrode pairs and through the fluid within the network. In accordance with MHD principles, the magnetic field is oriented approximately perpendicular both to the orientation of the electric field and to the axis of flow along the conduit. Interaction of the electric and magnetic fields generate volumetric forces, called Lorentz body forces that propel the fluid through the network. By the selective application of electric fields of specific currents or potentials at various points in the network for specific time intervals, the fluid may be directed with precision through the network in any desired pattern without the need for moving parts such as mechanical pumps or valves. In this manner, the control and flow of fluid through the network is similar to the control and flow of an electrical current in an electronic circuit.

The fluidic network is controlled by means of at least one electrode controller in operational engagement with the electrodes positioned on the sidewalls of the conduits. The controller or controllers implement an activation sequence of currents or potentials that are applied across the electrode pairs of the network. In one embodiment, the activation sequence is determined in accordance with an algorithm. The algorithm can be in any form that is capable of determining the magnitude, polarity and duration of current or potential across various electrode pairs throughout the network associated with generating a precise pattern of Lorentz forces for propelling the fluid in a controlled manner along any desired path through the network including, for example, an equation, a series of equations, a series of iterative steps, or software. The activation sequence may be entirely pre-determined by the algorithm or determined with the use of feedback generated by the operation of the network.

Another aspect of the invention is a controlled, magnetohydrodynamically-driven thermal cycler comprising the fluidic network of the present invention positioned at least partially within a temperature gradient. The imposition of a temperature gradient across the network allows fluid to move through one or more zones of differing temperatures as it circulates within the network. By circulating materials through different temperature zones, chemical and biochemical reactions such as, for example, PCR may be readily accomplished. The thermal cycler described herein may be used singly or in combination, and may operate either as part of an MHD-driven fluidic network, as a component in a non-MHD fluidic system, or as a stand-alone device.

Yet another aspect of the invention is a MHD stirrer for use in microfluidic networks. The MHD stirrer comprises a conduit or cavity having at least two electrodes disposed therein such that complex secondary flows including flows characterized by chaotic advection are generated upon application of a current or potential across electrode pairs in a magnetic field. If two electrodes are used, at least one electrode must be movable between at least two positions to allow for the alternating application of current or potential across the electrodes in at least two different positions. If three or more electrodes are used, then the electrodes may be movable or fixed provided that a current or potential is alternately applied between electrode pairs in at least two different positions. In either embodiment, the application of a current or potential across the electrodes induces at least two different alternating flow patterns which in turn induces chaotic advection. The MHD stirrer may be used singly or in combination, and may operate either as part of an MHD-driven microfluidic network, as a component in a non-MHD microfluidic system, or as a stand-alone device.

A further aspect of the invention is a method for controlling the flow of fluid through a MHD-driven fluidic network comprising a plurality of connected and individually controlled conduits each having a pair of opposing walls and at least one pair of electrodes disposed along the opposing walls, comprising the step of implementing an activation sequence of electrical currents or potentials across the electrode pairs by means of at least one electrode controller governed by an algorithm and in operable engagement with the electrode pairs.

Yet another aspect of the present invention is a method for generating chaotic advection within a conduit or chamber of a microfluidic network having at least two electrodes disposed therein comprising the step of applying an electrical current or potential across the electrodes to generate at least two different alternating flow patterns and induce chaotic advection. In one embodiment, the current or potential is alternately applied between a stirring electrode and at least two different electrodes disposed along the internal walls of the conduit. The two electrodes may be disposed on the same wall, on adjacent walls or on opposing walls of the conduit. In an alternative embodiment, the current or potential is alternately applied between one electrode disposed along an internal wall of the conduit and at least two stirring electrodes positioned within the conduit and away from the internal wall. In another embodiment, the polarity of the electric field between the one or more stirring electrodes and the one or more electrodes disposed along the internal walls is repeatedly reversed. The Lorentz forces generated by the configuration of electrodes and applied currents or potentials within the conduit result in secondary flows, and in particular flows characterized by chaotic advection, which are effective in mixing laminar fluids such as fluids present within a microfluidic network.

BRIEF DESCRIPTION OF THE DRAWINGS

The foregoing summary and the following detailed description of exemplary embodiments of the invention are better understood when read in conjunction with the accompanying drawings.

FIG. 1*a* is a top view of a conduit of a MHD microfluidic network

FIG. 1*b* is a cross-section view of the conduit shown in FIG. 1*a*.

FIG. 2*a* is a cross-section view of an arrangement of electrodes within a conduit in accordance with one embodiment of the invention.

FIG. 2*b* is a cross-section view of an arrangement of electrodes within a conduit in accordance with another embodiment of the invention.

FIG. 3*a* is a top view of a microfluidic network lacking physical walls with its conduit boundaries defined by the layout of electrodes.

FIG. 3*b* is a cross-section view of the microfluidic network shown in FIG. 3*a*.

FIG. 4 is a schematic representation of a fluidic network with individually-controlled branches numbered 1 through 6 and nodes labeled a through e. An inlet port is located at node a, and exit ports are located at nodes c and e.

FIG. 5 is a schematic representation of a MHD fluidic network with individually-controlled branches numbered 1 through 9 and reagent reservoirs denoted $R_1$ and $R_2$.

FIG. 6 is an exploded view of the fluidic network shown schematically in FIG. 5 depicting the layers used in the construction of the device.

FIG. 7 is a schematic representation of a MHD network that can be used for combinatorial interactions.

FIG. 8 depicts a time-series of images of the predicted and observed stirring of a drop of material inserted in the conduit when two internal electrodes are alternately engaged.

FIG. 9 is a cross-section view of a cylindrical MHD stirrer having two internal, eccentrically-located electrodes A and B and a peripheral electrode C.

FIG. 11 is a schematic representation of another embodiment of a MHD stirrer in which the electrodes are transverse to the conduit's walls and they are labeled $A_i$ (i= . . . −2, −1, 0, 1, 2, . . . ).

DETAILED DESCRIPTION OF THE INVENTION

Figure 10A:
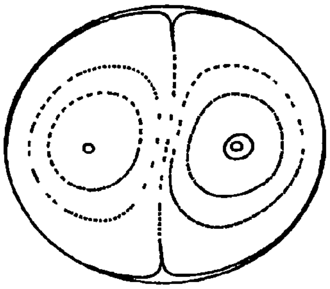
FIGS. 10*a* through 10*i* depict Poincaré sections (stroboscopic images) of the trajectories of passive tracers (FIGS. 10*a* through 10*c*), actual passive tracers' trajectories (FIGS. 10*d* through 10*f*), and flow visualizations (FIGS. 10*g* through 10*i*) of traces of a drop of dye inserted in the cavity as functions of the alternations period (T).
Figure 10B:
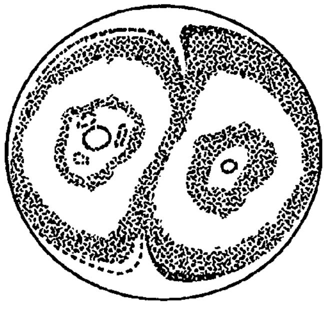

Controlled-flow MHD fluidic networks, thermal cyclers, and chaotic advection stirrers for use in microfluidic devices for processing and analyzing biological and chemical samples such as laboratories on chips and micro-total analysis systems are described.

The controlled-flow MHD fluidic network comprises a plurality of connected and individually controlled conduits for the transmission of fluid each conduit having a pair of opposing walls, at least one pair of electrodes disposed along the opposing walls of the conduits, and at least one electrode controller in operational engagement with the electrodes for implementing an activation sequence of currents or potentials across the electrode pairs. In preferred form, the network further comprises an algorithm for determining the activation sequence. Movement of fluid through the network is accomplished in accordance with principles of magnetohydrodynamics which utilize the interaction of approximately perpendicularly oriented electric and magnetic fields to generate Lorentz forces within the network. The pattern of Lorenz forces moving fluid through the network is governed by the activation sequence which defines the particular magnitude, polarity and timing of current or potential to be applied across individual electrode pairs. The activation sequence itself is determined by an algorithm which may produce a predetermined activation sequence or a sequence which uses information about the state of the fluidic network or of the fluid circulating within the network during operation of the network. In this manner, fluid within the network that is at least slightly conductive may be directed with precision and control through the network along any desired path and without the need for mechanical valves or pumps.

The basic building block of the controlled-flow MHD fluidic network is the conduit. Described generally with reference to FIGS. 1*a* and 1*b*, the individual conduit of the fluidic network has length L, width W, and height h. The conduit may be capped, as depicted in FIGS. 1*a*, 1*b*, 2*a* and 2*b*, or open from above as shown in FIG. 6. Moreover, conduits comprising a network of conduits may have the same or different shapes, lengths and sizes provided that the conduits are capable of bearing electrodes positioned suitably for the generation of Lorentz forces upon the application of a current or potential within a magnetic field. Suitable configurations include, for example, rectangular, as shown in FIGS. 2*a* and 2*b*. Alternatively, the conduits may comprise straight, curved or slanted walls that in cross-section are square, trapezoidal, circular, oval, or any other such suitable shape or combination of shapes.

The network of conduits may be simple or complex comprising any combination of curved or straight conduits with few or many interconnections arrayed in either two or three dimensions. A network comprising solely of straight conduits is shown in FIG. 7, and FIG. 5 depicts an example of a network comprising a combination of straight and curved conduits. Further, FIGS. 4, 5, and 7 provide schematic depictions of embodiments of relatively simple, two-dimensional networks. In FIGS. 4 and 5, the individual conduits, similar in structure to the conduit depicted in FIGS. 1*a* and 1*b*, are denoted with numbers. The network can be connected to external supplies and drains denoted as a, c, and e in FIG. 4. Alternatively, fluid can circulate inside the network without external links as shown in FIG. 5.

The MHD-controlled networks can be fabricated from a variety of substrate materials including, for example, silicon, monomers, prepolymers, polymers, elastomers, glass, plastics, metals (in combination with dielectric materials) and ceramic materials such as, for example, low temperature, co-fired ceramic tapes. Ceramic tapes are a convenient substrate material as they are dielectric and amenable to layered manufacturing techniques. Individual tapes may be machined and electrodes, conductors, and resistors may be printed or otherwise applied on the tapes with metallic pastes or inks in their green (pre-fired) state when the tapes are soft and pliable. A plurality of individually processed tapes can then be stacked, aligned, laminated, and co-fired to form a monolithic device that integrates hydraulic conduits and conductive paths arrayed in a two or three dimensions. Such manufacturing techniques also provide a means for inexpensive and rapid prototyping. Ceramic tapes may further include magnetic materials such as magnetic particles thus integrating the magnetic field source into the substrate and eliminating the need for the use of external magnets to generate Lorentz forces within the network.

In the pre-fired (green) state, ceramic tapes may comprise oxide particles such as alumina and/or silica, glass frit, and an organic binder that can be made from photo-resist. The tapes are available in a variety of thicknesses, typically from about 100 μm±7% to a few hustred microns, although thinner tapes of about 40 μm can be casted. The tapes in their green state are soft and pliable, and can be readily machined by a variety of known techniques including laser, milling, and photolithography when the binder is photo-resist. Conductive paths such as metallic circuits may be either printed, processed photolithographically, or otherwise applied to the tapes to form electrical circuits and components such as electrodes, resistors, conductors, and thermistors. Conduit sizes may be any size suitable for use in MHD-driven fluidic networks, and in one embodiment may range from about 10 μm to several millimeters. Individual tapes may be stacked, aligned, laminated, and co-fired to form sintered, monolithic structures having complex, either two- or three-dimensional networks of fluidic conduits, electronic circuits, and electrodes. Glass or other materials can be attached to or incorporated in the tapes to facilitate optical paths. Further, the tapes may include a magnetic material such as magnetic particles and/or a single or multiple layers of coils may be embedded in the tapes to generate a magnetic field.

The conduits of the fluidic network are provided with at least one pair of electrodes (denoted in FIGS. 1*a* and 1*b* as 11*a* and 11*b* of length Le) positioned on opposing internal surfaces of the conduit. These electrodes, referred to as driving electrodes, define the region along the conduit in which an electric current or potential is applied. The driving electrodes may be positioned on the internal surfaces of the conduits in a variety of ways all of which are considered within the scope of the invention. Two such electrode configurations are depicted in FIGS. 2*a* and 2*b*. FIG. 2*a* depicts an arrangement of electrodes comprising four individual electrodes 12*a*, 12*b*, 12*c*, and 12*d* positioned along the corners of a conduit as shown incross-section in operational engagement with electrode controller 8. FIG. 2*b* depicts an arrangement of electrodes comprising a pair of individual electrodes 14*a* and 14*b* each covering the entire area of opposing sidewalls of a conduit in operational engagement with electrode controller 8. The arrangement of electrodes as shown in FIG. 2*b* is a configuration that can provide a nearly uniform current density in a fluid within the conduit. Electrodes may also be used to control the shape of the velocity profile and, depending on the specific application, arrangements other than those shown in FIGS. 2*a* and 2*b* may be preferable.

It is further aspect of the invention that not every individual conduit within the network need be provided with driving electrodes provided that conduits that are not so equipped are in communication with at least one conduit that is so equipped. In this manner, the propulsion of fluid through the conduit having driving electrodes is capable of driving fluid through the conduit lacking such electrodes. In preferred form, the driving electrodes terminate some distance away from the ends of the conduit so as to minimize current leakage (cross-talk) between or among adjacent conduits comprising the network.

The driving electrodes themselves may be used to form virtual conduits, that is, conduits which lack physical walls for the containment of the fluid. Flow of fluid through a network comprising virtual conduits is spatially defined by the configuration of the electrodes on the substrate and controlled by the current or voltage applied across electrode pairs. In such networks, the electrodes may either protrude from, be flush with, and/or terminate beneath the surface of the substrate. FIGS. 3*a* and 3*b* depict an example of a toroidal virtual conduit 16 and a straight virtual conduit 18 in which the "walls" of the conduits are the electrodes 17*a*, 17*b*, 19*a*, and 19*b* themselves. FIGS. 3*a* and 3*b* correspond, respectively, to a top view and a view in cross-section of the virtual conduits. Complicated patterns of electrodes may be readily manufactured using a variety of printing and lithographic techniques for applying the electrodes to the substrate.

Each pair of driving electrodes is in operable engagement with an electrode controller that acts to control the magnitude, polarity and timing of the current or potential applied across pairs of driving electrodes. The network may comprise a single electrode controller in operable engagement with each of the driving electrodes of the network. Alternatively, the network may comprise a plurality of electrode controllers each of which controls one or more driving electrodes of the network. In one embodiment, each pair of driving electrodes is controlled by a separate electrode controller. By controlling the current and/or potential applied across each electrode pair, the one or more electrode controllers regulate in a precise pattern and with precise timing the generation of Lorentz forces that propel the fluid through the conduits of the network. An implementation of an exemplary electrode controller and algorithm are described in greater detail in Bau, H., H., Zhu, J., Qian, S., and Xiang, 2003, Y., *A Magneto-Hydrodynamically Controlled Fluidic Network*, Sensors and Actuators B: Chemical, 88, 205-216, which is incorporated herein in its entirety.

The one or more electrode controllers of the network are governed by an activation sequence that coordinates and controls the flow and combination of fluids within the network. In one embodiment, the activation sequence is determined in accordance with an algorithm which computes and defines the magnitudes, polarities and timing of currents or potential differences applied across the various driving electrode pairs of the network that are necessary to achieve the desired control of flow paths and flow rates throughout the network. The algorithm can be in any form that is capable of determining the specific current or potential across various electrode pairs throughout the network associated with generating a precise pattern of Lorentz forces for propelling the fluid in a controlled manner along any desired path through the network including, for example, an equation, a series of equations, a series of iterative steps, or software. In one embodiment, the user specifies the desired flow path and the flow rates associated with the various conduits. The algorithm then computes the magnitudes, polarities and timing of currents or the voltages that are needed to implement the desired conditions. The algorithm may also compute the magnitudes, polarities and timing of currents or voltages while minimizing an objective function such as, for example, the total power dissipation of the device. The sequence of specific magnitudes, polarities and timing of currents or voltages across particular electrode pairs comprises the activation sequence that is used by the electrode controllers to generate the Lorentz forces necessary to propel fluid in the network along the desired flow path.

Preferably, the algorithm is in the form of a software program capable of calculating specific magnetic and/or electric field strengths associated with flow rates within conduits of a known size. As a software program, the algorithm may be resident on the one or more electrode controllers or located remote from the controllers provided the activation sequence generated by the algorithm is capable of communication with and implementation by the one or more electrode controllers. The algorithm may determine the magnitude, polarity and timing of current or potential in a predetermined mode or in a mode that uses feedback generated by the operation of the network in determining the activation sequence. In embodiments in which the activation sequence is determined at least partially with the use of feedback, the network further comprises a sensor assembly capable of continuously or periodically collecting information about the state of the network or the fluid circulating within it during operation and inputting this information into the algorithm. MHD-driven fluidic networks in which movement through the network can be controlled by an activation sequence generated by an algorithm are suitable for a variety of applications including point-of-care medical diagnosis; laboratory diagnosis; drug discovery; air, food, and water quality monitoring; and detection of pathogens and chemical agents associated with biological and chemical warfare agents.

In accordance with MHD principles, the orientation of the magnetic field need not be vertical with respect to a conduit oriented in a horizontal plane. For example, if a pair of driving electrodes were positioned on the top and bottom walls of the conduit oriented in a horizontal plane, MHD principles would require the magnetic field to be oriented also horizontally but transverse to the direction of flow of the conduit. Thus, the controlled-flow MHD fluidic network of the present invention may accommodate any combination of electrical and magnetic fields that are approximately perpendicular to each other and in any orientation with respect to the conduit provided both fields are approximately perpendicular with respect to the axis of flow through the conduit. In one embodiment, the conduits comprising the network are arranged in a planar configuration and the magnetic field is oriented approximately perpendicular to the plane in which the conduits are arrayed.

As shown in FIGS. 1$a$ and 1$b$, a three-dimensional Cartesian coordinate system can be represented with respect to an exemplary conduit of the network by axes $x_1$, $x_2$, and $x_3$. The vertical arrow denoted with the letter (B) indicates the orientation of the magnetic field. In operation, the entire device is subjected to a magnetic field of a specific intensity. The magnetic field may be generated by a permanent magnet or an electromagnet. Alternatively, the entire network may be fabricated with the inclusion of a magnetic material, thereby eliminating the need for an external magnetic field source. The most suitable source for the magnetic field will depend on a variety of factors including the particular application for which the network is intended. In other embodiments, synchronized, alternating electric and magnetic fields may also be used. In such embodiments, the fields may be synchronized such that the resulting Lorentz forces remains essentially steady.

Fluid is transmitted from one region of the MHD network to another by currents $I_i$ or potential differences $V_i$ applied across the driving electrode pairs within the conduits of the network. The potential difference $V_i$ in a given conduit (i) induces an electric current of density $J_i$~$s_iV_i/W_i$ where $W_i$ is the conduit's width and $s_i$ is the specific electric conductivity of the fluid. This current, in turn, interacts with the magnetic field to produce a Lorentz body force of density ($J_iB$) directed along the axis of the conduit. The magnitude of the force and its direction may readily be controlled by respectively controlling the magnitude and polarity of either the potential difference $V_i$ or the current $I_i$. Since the relationship between the flow rate and the current is linear over the domain of interest, the electric current typically will be the preferred control variable. To a first approximation, the flow rate ($Q_i$) in the conduit is given as a function of the potential difference $V_i$ (or the current $I_i$), and the pressure drop across the length of the branch ($DP_i$) by the constitutive relationships of the type: $Q_i=H_iDP_i+M_i^VV_i$ or $Q_i=H_iDP_i+M_i^II_i$ where $H_i$ and $M_i$ are, respectively, the hydraulic and MHD conductivities. Preferably, the conduits comprising the network are sufficiently long so that fringe effects can be neglected, and the current flow is essentially one-dimensional.

An exemplary MHD-controlled fluidic network is shown in FIG. 4. The individual conduits comprising the network are denoted by the numbers 1 through 6 and the nodes are denoted with the letters a through e. Nodes a, c, and e communicate beyond the network or with reagent reservoirs and serve as sinks and sources. In an alternative embodiment, the network is not provided with any sinks or sources. Conduits which do not contain driving electrodes have hydro-magnetic conductivity set to zero. For the network depicted in FIG. 4, six equations relate the flow rate in a conduit to the pressure drop along that conduit's length and the potential difference across the electrodes. Additionally, mass continuity (Kirchhoff s law) requires that all the flow rates arriving at each node sum up to zero. When the potential differences across all the conduits and the pressures at the sources and sinks are given, these equations can be solved to obtain the flow rates in all the conduits.

An embodiment of the network as shown in FIG. 5 is manufactured with low temperature, co-fired ceramic tapes. The device has planar architecture, that is, all the conduits of the network are arrayed in a single layer. While the single conduit layer shown in FIG. 5 consists of a plurality of tapes, an individual layer may be formed from a single tape or from a series of tapes depending on the thickness of the tapes and the desired layer thickness. In an alternative embodiment, conduits may be fabricated in multiple layers and interconnected through one or more vertical wells to form a network comprising a three-dimensional array of conduits.

In one embodiment, a planar, MHD-controlled fluidic network is fabricated with LTCC 951AX co-fired ceramic tapes supplied by DuPont that have a nominal (pre-fired) thickness of ~250 μm. FIG. 6 provides an exploded view of the elements of the network as shown schematically in FIG. 5. The fabrication process consists of blanking rectangular segments of tapes to a desired size. A few layers of tapes are laminated to form a part. The various parts are machined individually using a numerically-controlled milling machine. Subsequently, electrodes and conductor paths are printed on the various parts.

In one embodiment as shown in FIG. 6, layer 40 is the top layer that contains the flow conduits 42 and includes 1.1 mm widex 1.7 mm deep flow conduits 42 and soldering pads 44 using DuPont 6134 solderable conductors. The soldering pads 44 are connected through vertical vias 45 filled with DuPont 6141 via fill paste (not shown) to the various electrodes. While relatively large conduits are fabricated in this embodiment to facilitate easy flow visualization, similar networks may be fabricated having much smaller dimensions. Layer 46 comprises the bottom wall of the conduits 48 and contains the electrodes 50 and some of the electrical leads 52 connecting to the electrodes. A more detailed layout of the electrodes shown in layer 46 is provided in insert E. About 20 μm thick×2 mm wide electrodes 50 made from DuPont 5734 gold paste are printed on the surface of layer 46. The gold electrodes 50 are aligned with the edges of the conduits 42 such that when layers 40 and 46 are attached, about 0.1 mm of the widths of the electrodes 50 along each side of the conduits' vertical walls are exposed to the conduits 42. Each conduit 42 is provided with a pair of driving electrodes 50. A gap separates the driving electrodes in adjacent conduits. Silver conductors 56 made from DuPont 6145 conductor paste are printed on both layers 46 and 54 to facilitate the connection of each electrode to the soldering pads located on the surface of layer 40. All the leads are connected through vertical vias 45 to terminals located on the surface of layer 40. Layer 58 the bottom layer, contains additional leads (not shown). Subsequent to machining and printing, the individual parts are stacked, aligned, laminated, and co-fired to form a sintered, monolithic block. The device may capped with a cover plate or left uncapped to facilitate easy access to the channels and to enable dye injection for flow visualization.

In one embodiment, the electrodes of the network may be controlled by an electrode controller comprising computer-controlled relay actuators and a D/I card. The relays are programmed to switch on and off in such a way that any one or combination of electrode pairs in the network can be active at any given time and for any given interval. Additionally, the relays allow for the switching of the polarity of any given pair of electrodes and the supply of power either in controlled-voltage or controlled-current modes.

In operation, the conduits are filled with a fluid that is at least slightly conductive such as, for example, saline solution. While 0.1M and 0.3M solutions are suitable, MHD-driven networks can operate with ion concentrations as low as about 50 mM. The device is placed on top of a neodymium (NdFeB) permanent magnet of approximate intensity B=0.4 T (Edmund Scientific). Dye (Cole Parmer Instrument Co.) is injected at various locations to achieve flow visualization.

The fluidic network may be analyzed using linear graph theory methodology, and the potentials $V_i$ or currents $I_i$ may be determined so as to direct the fluid to follow any desired path. In one set of experiments utilizing a network configured as shown in FIG. 5, a trace of dye was inserted into the fluid at conduit 1. The electrodes of all the conduits were activated, and the network was programmed to pump the fluid around the large circuit (conduits 1, 2/3, 4, 5/6, and 7) with the flow divided between conduits 2 and 3 and between conduits 5 and 6. By appropriate choice of current or potential differences, the flow can be split between conduits 2 and 3, and between conduits 5 and 6 in any desired proportion. When the dye entered the torus comprising conduits 2 and 3, the electrodes within all the conduits but 2 and 3 were switched off. The polarity of conduit 3's electrodes was reversed, and the fluid was forced to circulate around the torus. In one embodiment, the torus can be positioned across a temperature gradient having two or more different temperature zones such as may be needed for DNA amplification reactions. Subsequently, the polarity of electrodes in conduit 3 was reset to its original setting, all the other electrodes were turned on, and the dye was pumped out of the torus into conduit 4. The dye then split between conduits 5 and 6 and recombined in conduit 7. By appropriate choice of current or potential differences, the flow can be made to circulate around the loop consisting of conduits 6 and 7. In an alternative network, liquids are pumped from the wells at the end of conduits 8 and 9, the fluids are mixed in conduit 1 equipped with stirring electrodes as described herein, and the electrodes are programmed to pump the liquid into the torus defined by conduits 2 and 3.

FIG. 7 depicts schematically a more complicated MHD network consisting of a plurality of wells 62 and conduits 10 through which reagents, analytes, or chemicals may be pumped along any desired path and stirred, causing various interactions and/or reactions. Each of the conduits shown in FIG. 7 has a structure similar to the conduit depicted in FIG. 1. Analytes and reagents may be pumped from any of the wells, brought together, and mixed to interact and/or react with reagents pumped from other wells. The network may also facilitate combinatorial screening in which many processes are carried out in parallel. Moreover, reaction and interaction products may be used in subsequent reactions or interactions in either pre-determined or feedback modes. The embodiment depicted in FIG. 7 can readily be expanded to a three-dimensional network allowing a much larger number of connections. These examples illustrate that MHD-controlled networks provide an easy, effective and inexpensive way of circulating fluids through microfluidic laboratory on a chip conduits.

MHD-controlled networks can operate with a wide variety of electrolyte and buffer solutions such as, for example, solutions containing NaCl, KCl, $NH_4Cl$, $CuSO_4$, $FeCl_2/FeCl_3$, $NaH_2PO_2$, and Hydroquinone among many others. The performance of the device, however, may be affected by the particular solution and electrode materials that are used. For example, the use of NaCl solutions may lead to bubble production at relatively high current densities and electrode corrosion. To the extent MHD-driven devices are used as disposable devices, electrode corrosion may not be an issue of significance. Moreover, the MHD-driven devices, depending on the application, can operate either open or capped. With open conduits, bubble formation may not present a problem. In closed conduits, however, bubble generation must be addressed and preferably limited. In one embodiment, the use of redox species such as $FeCl_2/FeCl_3$ solution with platinum electrodes may sustain higher current densities than a NaCl solution without bubble formation and without electrode corrosion. Ultimately, though, the choice of the electrolyte or buffer is dictated by, among other things, the compatibility of the electrolyte or buffer with the specific processes to be performed in the system. In addition to the MHD forces, the fluid within the network may also be subject to a pressure gradient that is either flow assisting or flow adverse.

Another aspect of the present invention is an MHD stirrer. Chemical reactions and biological interactions in a microfluidic device often involve mixing or stirring fluids in order to bring various molecules together. Mixing by diffusion alone in a microfluidic device is often not efficient. The diffusion time of macromolecules may be prohibitively large even when the lengths are measured in hundreds of microns. Moreover, since flows are often laminar and corresponding Reynolds numbers in microdevices are usually very small, one is also denied the benefits of turbulence as an efficient mixer.

In one embodiment, the MHD stirrer of the present invention comprises a conduit or chamber having at least two electrodes disposed therein such that the application of a current or potential across the electrodes within a magnetic field generates secondary flows such as flows characterized by chaotic advection. In embodiments in which two electrodes are used to induce chaotic advection, at least one electrode must be movable so that the current or potential may be applied alternately across electrode pairs in at least two positions. In embodiments in which at least three electrodes are used, the electrodes may be movable or fixed and disposed along and/or away from the internal walls of the conduit or chamber. In either embodiment, a current or potential is alternately applied across electrodes occupying at least three positions to induce at least two alternating flow patterns which generates chaotic advection.

In one embodiment, the MHD stirrer of the present invention comprises a conduit having at least one electrode disposed along the wall of the conduit, and at least two electrodes positioned within the conduit and away from the wall. In another embodiment, the MHD stirrer comprises at least two electrodes disposed along at least one wall, and at least one electrode positioned within the conduit and away from the wall. In a further embodiment, the stirrer has at least two electrodes aligned along at least one wall, and at least one electrode disposed along another wall. In yet another embodiment as shown in FIGS. 1*a* and 1*b*, the MHD stirrer comprises a pair of electrodes 11*a* and 11*b* disposed along the opposing walls 10*a* and 10*b*, and at least two electrodes 11*ci* positioned within the conduit and away from the opposing walls. In this embodiment, the electrodes 11*ci* positioned within the conduit and away from the opposing walls 10*a* and 10*b* may be aligned as shown in FIG. 1*a* along the centerline of the conduit's bottom. In still another embodiment, the MHD stirrer comprises a cylindrical chamber with an electrode disposed around its internal periphery and at least two electrodes positioned eccentrically inside the chamber. The placement of the one or more electrodes permits the generation of complex secondary flows including flows characterized by chaotic advection that is beneficial for mixing or stirring within a fluidic conduit or chamber. The conduits as described in all of these embodiments may comprise a conduit of the MHD-driven fluidic network or thermal cycler of the present invention.

MHD stirrers that generate chaotic advection may operate either by varying the current or potential applied across electrode pairs between zero and a prescribed value (either positive or negative) or by repeatedly reversing the polarity of each electrode by varying the current or potential between negative and positive values. Depending on the particular electrolyte used, reversal of polarity may be advantageous in certain cases since by reducing electrode corrosion and bubble accumulation on electrode surfaces. Furthermore, in applications in which analyte migration in the electric field is a problem, reversing polarity is likely to reduce or eliminate such migration.

In the embodiment shown in FIGS. 1*a* and 1*b*, a conduit 10 of a controlled, MHD-driven microfluidic network is provided with a pair of electrodes 11*a* and 11*b* disposed on opposing walls 10*a* and 10*b* of the conduit and a series of electrodes denoted 11*ci* disposed along the centerline of the conduit and away from the opposing walls. Electrodes 11*ci* (where i=1, 2, 3, . . . ) are referred to as stirring electrodes. This particular implementation of the stirrer is described in greater detail in Qian, S., Zhu, J., and Bau, H. H., 2002, A Stirrer for Magneto-Hydrodynamically Controlled Micro Fluidic Networks, Physics of Fluids, 14 (10): 3584-3592 which is incorporated herein in its entirety.

In order to operate a MHD conduit as a stirrer, the electrodes intended for use in creating secondary flows are in operable engagement with at least one electrode controller such as, for example, a computer-controlled relay actuator. In one embodiment, relay-actuators combine both driving electrodes 11*a* and 11*b* into a single electrode C. When a potential difference is applied across the electrode pair C-11*ci*, circulatory motion of the fluid within the conduit is generated, with the fluid circulating around electrode 11*ci*. When the electrode pair C-11*c*1 is activated for a time interval T1, electrode pair C-11*c*2 for another time interval T2, then electrode pair C-11*c*1 once again, and so on in a periodic fashion, chaotic advection is generated. As the magnitude of the period (T=T1 T2) increases, the chaotic region increases in size and complexity. In some circumstances, it may be advantageous to alternate the electrode potentials in anon-periodic fashion.

In demonstrating this effect, flow visualization experiments of the stretching and deformations of a dye blob were performed. FIG. 8 depicts computational and experimental results when a blob of dye 70 was inserted into the conduit 72 and the evolution of the dye was tracked over time. Both in experiment and theory, a rapid spread of the dye was observed indicating efficient stirring. By engaging a larger number of electrode pairs C-11*ci*, one can further extend the fraction of the conduit that participates in the mixing process. As electrodes may be readily patterned into various shapes, electric fields may be induced in different directions. The interaction of such electric fields with the magnetic field can be used to induce secondary complex flows that may be beneficial for stirring and mixing.

Stirring electrodes such as electrodes Ai shown in the embodiment depicted in FIGS. 1*a* and 1*b* may be located singly or in combination anywhere within a conduit provided they are away from either of the opposing walls. The electrodes need not to be aligned along the conduit's center. Although it is convenient to print the electrodes on the device's floor to avoid intrusion, one can also use other arrangements such as, for example, electrodes in the form of pins that protrude into the conduit.

The MHD stirrer may comprise either an open or a closed cavity of any suitable shape. With reference to FIG. 9, an embodiment of the stirrer is described comprising a circular cavity with an electrode C deposited along its periphery. Two additional electrodes, A and B, are deposited on the cavity's bottom. The cavity is filled with a conducting liquid such as, for example, a saline solution, and it is positioned in a uniform magnetic field oriented parallel to the cavity's axis. When a potential difference is imposed across the two electrodes A and C, an electric current flows between the two electrodes and the interaction between this current and the magnetic field results in Lorentz forces that induce, for example, counterclockwise flow circulation in the cavity centered next to the location of electrode A. Subsequently, when the potential difference is switched from electrode pair A/C to electrode pair B/C, depending on the polarity of the electrodes, either a counterclockwise or a clockwise circulatory pattern may be induced centered next to the location of electrode B. The device is operated by alternately engaging electrode pairs A/C and B/C with a period T. In some circumstances, it may be advantageous to alternate the electrode potentials in a non-periodic fashion.

Figure 10C:
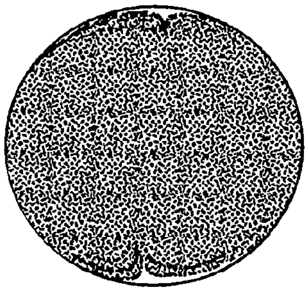
Figure 10D:
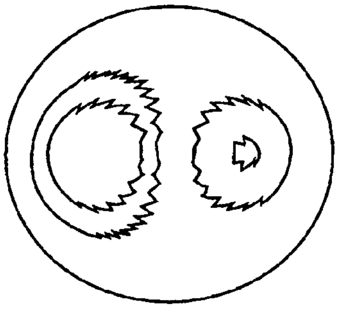
Figure 10E:
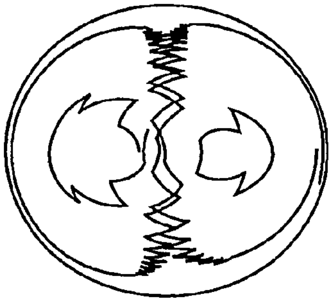
Figure 10F:
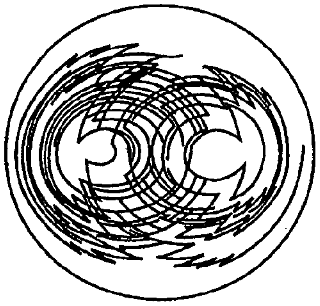
Figure 10G:
Figure 10H:

FIGS. 10*a* through 10*i* depict Poincaré sections (stroboscopic images) of the trajectories of passive tracers (FIGS. 10*a* through 10*c*), actual passive tracers' trajectories (FIGS. 10*d* through 10*f*), and flow visualizations (FIGS. 10*g* through 10*i*) of traces of a drop of dye inserted in the cavity as functions of the normalized (dimensionless) alternations period (T). The columns of FIGS. (10*a*, 10*d* and 10*g*), (10*b*, 10*e* and 10*h*) and (10*c*, 10*f* and 10*i*) correspond, respectively, to T=2, 6 and 8. When T=2, the motion depicted in the Poincaré section shown in 10*a* is mostly regular and consists of two sets of closed orbits, one set encircling one electrode and the other set encircling the other electrode. FIG. 10*d* depicts the actual motion of the tracer which shows the presence of jitters resulting from the tracer being trapped (at different times) by the flow fields induced by the two electrode pairs. The presence of two families of periodic orbits is well supported by the flow visualization experiments as shown in FIG. 10*g*.

Figure 10I:
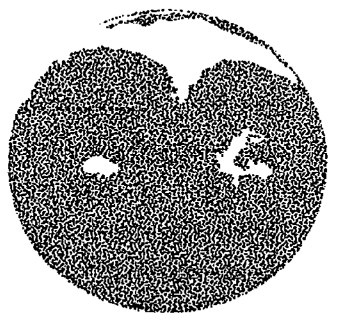
Figure 12A:
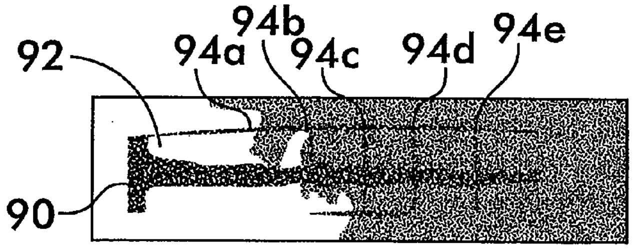
FIG. 12 depicts flow visualization experiments using a stirrer configured as depicted in FIG. 11.
Figure 12B:
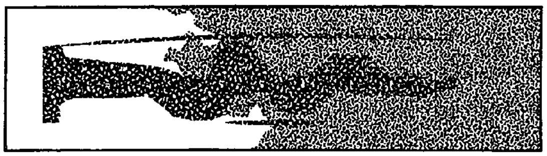
Figure 12C:
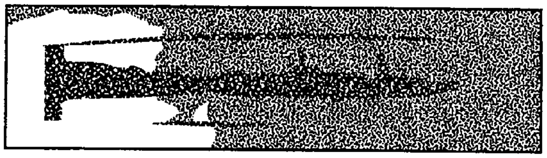
Figure 12D:
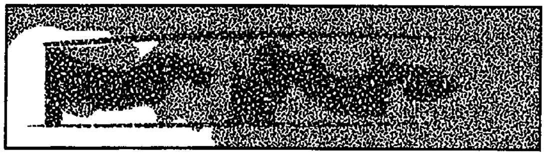
Figure 12E:
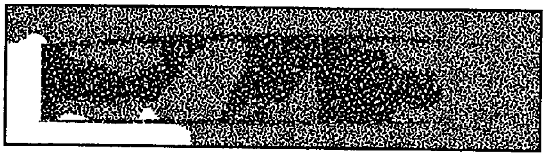

As the period T increases, chaotic islands become visible. FIG. 10*e* illustrates that as the period increases, so does the magnitude of the jitters. The presence of the global structure consisting of two counter-rotating circulations is visible in FIG. 10*h*. When T=8, FIG. 10*c* depicts the trajectory of a single tracer. The irregular chaotic region appears to have spread to cover almost the entire cavity. Similar to FIG. 10*c*, the flow visualization experiments depicted in FIG. 10*i* illustrate the presence of counter-rotating eddies through the existence of an unmixed zone at the ends of the diagonal that is perpendicular to the line connecting the two electrodes. The operation of the device is described in greater detail in Yi, M., Qian, S., and Bau, H. H., *A Magneto-hydrodynamic* (*MHD*) *Chaotic Stirrer*, J. Fluid Mechanics, 468, 153-177 (2002) which is incorporated herein in its entirety.

FIG. 11 depicts a schematic representation of another embodiment of a MHD stirrer. As shown in FIG. 11, the stirring electrodes 82*a*, 82*b*, 82*c*, 82*d*, and 82*e* are aligned perpendicular to the conduit's walls 80*a* and 80*b*. By subjecting these electrodes to varying potential differences in the presence of a magnetic field, forces are generated that drive fluid flow in various directions in "virtual" conduits whose geometry is dictated by the positioning of the electrodes. An implementation of the stirrer is described in greater detail in Bau, H. H., Zhong, J., and Yi, M., 2001, A Minute Magneto Hydro Dynamic (MHD) Mixer, Sensors and Actuators B, 79/2-3, 205-213; and Xiang, Y. and Bau, H. H., 2003, Complex Magneto Hydrodynamic, Low Reynolds Number Flows, Physical Review Letters B, 68, 016312-1-016312-11, which are incorporated herein in their entirety.

FIG. 12 depicts the deformation of an initially straight dye line resulting from the application of Lorentz forces by means of a MHD stirrer of the present invention. A thin trace of dye 90 (Water Soluble Fluorescent Liquid Dye, Model 298-16-Red, Cole Palmer Instrument Company, Niles, Ill., USA) is applied by means of a syringe across the cavity 92 and then a potential difference is applied across adjacent electrodes 94*a*, 92*b*, 92*c*, 92*d*, and 92*e*. As a result of the application of the potential difference, fluid flow is induced in the cavity. The motion consists of rotating cells with the fluid moving up in one interval between two electrodes and down in the adjacent interval. Frame A in FIG. 12 depicts the line of dye initially inserted into the device. Depending on the polarity of the electrodes, the dye either moves upwards or downwards as shown in frame B of FIG. 12. After a few seconds, the polarity of the electrodes is reversed. Since diffusion is relatively slow and the flow is at a relatively low Reynolds number, the dye retracts its steps in almost a reverse fashion as shown in frame C of FIG. 12 and then starts deforming in the opposite direction as shown in frame D of FIG. 12. When the process is allowed to continue for some time, the dye traces the convective cells as shown in frame E of FIG. 12 in good qualitative agreement with theoretical predictions.

The electrodes may be patterned in many different ways to induce various flow patterns. The embodiments described above are just a few examples of numerous possible variants of MHD stirrers.

Figure 13:
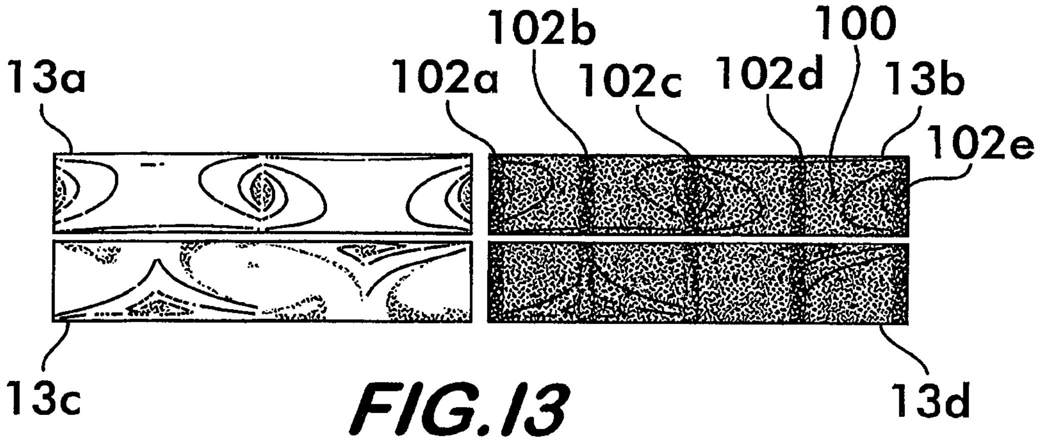
FIG. 13 illustrates the device depicted in FIG. 11 inducing chaotic advection by the deformation of a straight line of dye initially injected midway between the conduit's walls through the application of alternating potential differences between the evenly and oddly numbered electrodes. The figures in the left and right columns correspond, respectively, to theoretical predictions and experimental observations.

FIG. 13 compares theoretical predictions shown in the left column and experimental results shown in the right column obtained in another implementation. FIG. 13 depicts the deformation of an initially straight line of dye under various operating conditions. The top row, FIGS. 13*a* and 13*b*, depicts the flow structure when only the odd-numbered electrodes are active. By alternating the potential difference across non-adjacent pairs of electrodes, it is possible to induce chaotic motion in the cavity 100. For example, electrodes 102*a*, 102*c*, and 102*e* may be engaged for the time interval T1, and then electrodes 102*b* and 102*d* for the time interval T2. By repeating this mode of operation, fairly complicated flows are generated and effective stirring is provided. The results of this mode of operation are depicted in the bottom row of FIG. 13, FIGS. 13*c* and 13*d*.

Another aspect of the invention is a controlled, MHD-driven thermal cycler comprising the fluidic network of the present invention positioned at least partially within a temperature gradient. Magnetohydrodynamics provides the means to circulate fluids continuously in a closed loop. Different parts of the loop may be maintained at different temperatures, enabling the cycling of the liquid to subject the liquid to different temperature zones.

Figure 14:
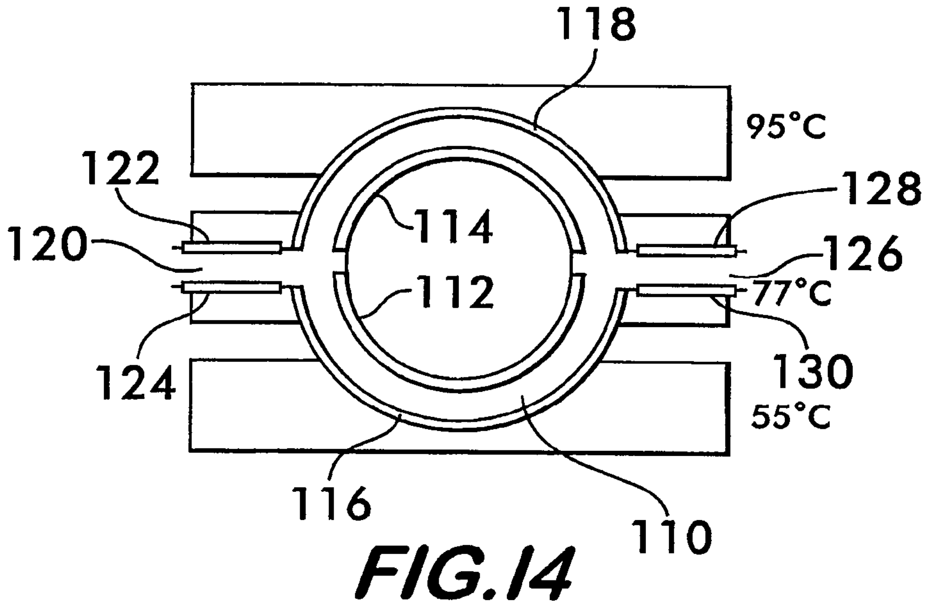
FIG. 14 depicts schematically a continuous flow thermal cycler that can be used for PCR. A1, A2, B1, B2, C1, C2, D1, and D2 are electrodes. The different shades of gray scale denote zones maintained at different temperatures.

FIG. 14 depicts one embodiment of the thermal cycler of the present invention. The cycler comprises a closed conduit loop 110 with electrodes aligned along opposing walls. Electrodes 112 and 114 are aligned along the inner wall of the loop 110, and electrodes 116 and 118 are aligned along the outer wall of the loop 110. An entry port 120 with electrodes 122 and 124 aligned along its opposing walls leads into the loop 110 and an exit port 126 with electrodes 128 and 130 aligned along its opposing walls leads out of the loop 110. While the device shown in FIG. 14 has one inlet and a separate exit port, the cycler may be equipped with a single port or larger number of inlet and exit ports. In order to utilize the conduit loop depicted in FIG. 14 as a thermal cycler, different parts of the loop are maintained at different temperatures. The various temperature zones may be maintained, for example, with the use of electrical resistors or thermoelectric units (not shown). FIG. 14 depicts three thermal zones. It is contemplated as within the scope of the invention that a larger or a fewer number of thermal zones may be used as is suitable with reference to the particular application.

At the beginning of operation, an electrical potential is applied to the electrodes such that the material is drawn into the loop. The polarities of either electrode pair 112 and 116 or electrode pair 114 and 118 are then reversed so that the material within the conduit loop is forced to circulate continuously around the loop. The particular choice of polarity will determine whether the motion is in the counterclockwise or clockwise direction. If necessary, the polarities and the magnitudes of the potentials applied to electrodes 110, 124, 128, and 130 may be adjusted so as to prevent the material within the conduit from leaving the loop. Also, if necessary, the direction of the flow in the thermal cycler may be periodically changed to minimize analyte migration in the electric field. As the material within the conduit cycles around the loop, it is exposed to different temperatures. In certain embodiments, this cycling between or among different temperature zones facilitates biological interactions such as, for example, those needed for PCR.

After the material within the conduit has completed the desired number of cycles around the loop, electrical potentials are supplied to the various electrodes so as to pump the reaction products out of the loop. The reaction products may be pumped either through the exit port 110 defined by electrodes 128 and 130 back through the inlet port 120 defined by electrodes 122 and 124 or split among any number of exit ports (not shown in the figure) so as to transport parts of the sample to different subsequent analysis paths. The embodiment of the MHD thermal cycler depicted in FIG. 14 may be readily integrated into a magneto-hydrodynamic network such as the one depicted in FIG. 6, integrated into a network in which fluids are propelled by other means than MHD, or used as a stand-alone device. In all three implementations, MHD stirrers of the present invention may be integrated into the MHD thermal cycler of the present invention to enhance efficiency.

One application of the MHD thermal cycler is for PCR. The MHD thermal cycler has the advantage over other continuous flow devices in that the number of cycles may be readily adjusted in a predetermined mode according to the characteristics of the analyte to be amplified or in a feedback mode with the use of a sensor capable of detecting the amplification rate. Since it is not necessary to cycle the substrate temperature as is done in conventional PCRs, the MHD thermal cycler is capable of facilitating rapid amplification of DNA.

The invention claimed is:

1. A magnetohydrodynamic stirrer for mixing liquid, comprising:
- a conduit having a longitudinal axis,
- said conduit comprising two opposing solid walls, each extending along said longitudinal axis and each abutting a solid floor;
- a magnet, electromagnet, or both disposed in proximity to said conduit;
- at least three interior electrodes disposed within said conduit,
- a first of said interior electrodes contacting one of said two opposing walls and contacting said floor, said first of said interior electrodes extending along said longitudinal axis,
- a second of said interior electrodes contacting the other of said two opposing walls and contacting said floor, said second of said interior electrodes extending along said longitudinal axis, and
- a third of said interior electrodes being disposed on said floor of said conduit at a distance from said two opposing walls; and
- a controller in operational engagement with said interior electrodes,
- said controller, during operation, being capable of the application of a potential, a current, or both between at least two of said interior electrodes so as to give rise to flow of a liquid along said longitudinal axis within said conduit during operation of said stirrer.

2. The magnetic stirrer of claim 1, wherein at least one of the interior electrodes is moveable.

3. The magnetohydrodynamic stirrer of claim 1, wherein at least one of said interior electrodes is a pin.

4. The magneto hydrodynamic stirrer of claim 1, wherein said conduit comprises an inlet and an outlet.

5. The magnetohydrodynamic stirrer of claim 1, wherein at least one of said interior electrodes is characterized as being linear in configuration.

6. The magnetohydrodynamic stirrer of claim 1, wherein at least one of said interior electrodes is characterized as being circular.

7. The magnetohydrodynamic stirrer of claim 1, wherein said controller is capable of effecting application of a periodic potential, current, or both between at least two of said interior electrodes so as to give rise to chaotic advection within a liquid disposed within said conduit during operation of said stirrer.

8. The magnetohydrodynamic stirrer of claim 1, wherein said controller is capable of effecting application of a non-periodic potential, current, or both between at least two of said interior electrodes so as to give rise to chaotic advection within a liquid disposed within said conduit during operation of said stirrer.

9. The magnetohydrodynamic stirrer of claim 1, wherein said magnet or electromagnet is disposed exterior to said conduit.

10. The magnetohydrodynamic stirrer of claim 1, wherein a portion of said conduit comprises a magnetic material.

11. The magnetohydrodynamic stirrer of claim 1, wherein said conduit further comprises a ceiling.

12. The magnetohydrodynamic stirrer of claim 11, wherein at least one of said interior electrodes is essentially flush with said floor or ceiling of said conduit.

13. The magnetohydrodynamic stirrer of claim 1, wherein said controller is in operational engagement with said magnet or electromagnet and said controller, during operation, modulates the application of a magnetic field from said magnet or electromagnet.

* * * * *